United States Patent
Chang et al.

(10) Patent No.: US 9,703,286 B2
(45) Date of Patent: Jul. 11, 2017

(54) DEVICE AND METHOD FOR VERIFYING CNC PRODUCTION ACCURACY

(71) Applicant: Shenzhen Airdrawing Technology Service Co., Ltd., Shenzhen (CN)

(72) Inventors: Chih-Kuang Chang, New Taipei (TW); Xin-Yuan Wu, Shenzhen (CN); Peng Xie, Shenzhen (CN)

(73) Assignee: Shenzhen Airdrawing Technology Service Co., Ltd., Shenzhen (CN)

( * ) Notice: Subject to any disclaimer, the term of this patent is extended or adjusted under 35 U.S.C. 154(b) by 380 days.

(21) Appl. No.: 14/520,844

(22) Filed: Oct. 22, 2014

(65) Prior Publication Data

US 2015/0120032 A1     Apr. 30, 2015

(30) Foreign Application Priority Data

Oct. 29, 2013    (CN) .......................... 2013 1 0522309

(51) Int. Cl.
*G06F 19/00* (2011.01)
*G05B 19/418* (2006.01)
*G05B 19/4097* (2006.01)

(52) U.S. Cl.
CPC ... *G05B 19/41875* (2013.01); *G05B 19/4097* (2013.01); *G05B 2219/31359* (2013.01); *G05B 2219/35225* (2013.01); *Y02P 90/22* (2015.11); *Y02P 90/265* (2015.11)

(58) Field of Classification Search
CPC .......... G05B 19/41875; G05B 19/4097; G05B 2219/35225; G05B 2219/31359; Y02P 90/22; Y02P 90/265

USPC .......................................................... 700/98
See application file for complete search history.

(56) References Cited

U.S. PATENT DOCUMENTS

| | | | | |
|---|---|---|---|---|
| 5,208,763 A | * | 5/1993 | Hong | G05B 19/402 700/192 |
| 2003/0171840 A1 | * | 9/2003 | Haupt | G05B 19/4097 700/175 |
| 2008/0052036 A1 | * | 2/2008 | Shimizu | G01B 21/20 702/156 |
| 2008/0250659 A1 | * | 10/2008 | Bellerose | G05B 19/402 33/1 MP |
| 2013/0345853 A1 | * | 12/2013 | Berman | G05B 19/4093 700/187 |

* cited by examiner

*Primary Examiner* — Ziaul Karim
(74) *Attorney, Agent, or Firm* — Steven Reiss

(57) ABSTRACT

In a production accuracy verification method to verify a production program installed in a computer numerical control (CNC) machine, wherein the production program is used to produce a product, coordinates of points on an ideal processing path of the production program are obtained to fit a first curve. A CAD model of the product is obtained, and outlines of the product are extracted in the CAD model. A normal vector of each of the outlines is computed and to be adjusted, making the normal vectors of the outlines pointing to a same direction. First distances between points in the first curve and corresponding points in the second curve are computed, and whether the production program is accurate can be determined by comparing whether each of the first distances is within a first predetermined tolerance.

14 Claims, 6 Drawing Sheets

DEVICE AND METHOD FOR VERIFYING CNC PRODUCTION ACCURACY

CROSS-REFERENCE TO RELATED APPLICATIONS

This application claims priority to Chinese Patent Application No. 201310522309.2 filed on Oct. 29, 2013, the contents of which are incorporated by reference herein.

FIELD

The present disclosure relates to computer aided control technology, and particularly to a device and method for verifying production accuracy of a computer numerical control (CNC) machine.

BACKGROUND

Computer numerical control (CNC) is the automation of machine tools that are operated by programmed commands encoded on a storage medium.

Inspectors can determine whether a CNC machine is operating well by manually detecting products produced by the CNC machine. The determination may be unreliable and inaccurate. Therefore, other ways of validating the work product of the CNC machine are desirable.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIG. 4 illustrates a part of a production program.

DETAILED DESCRIPTION

Figure 1:
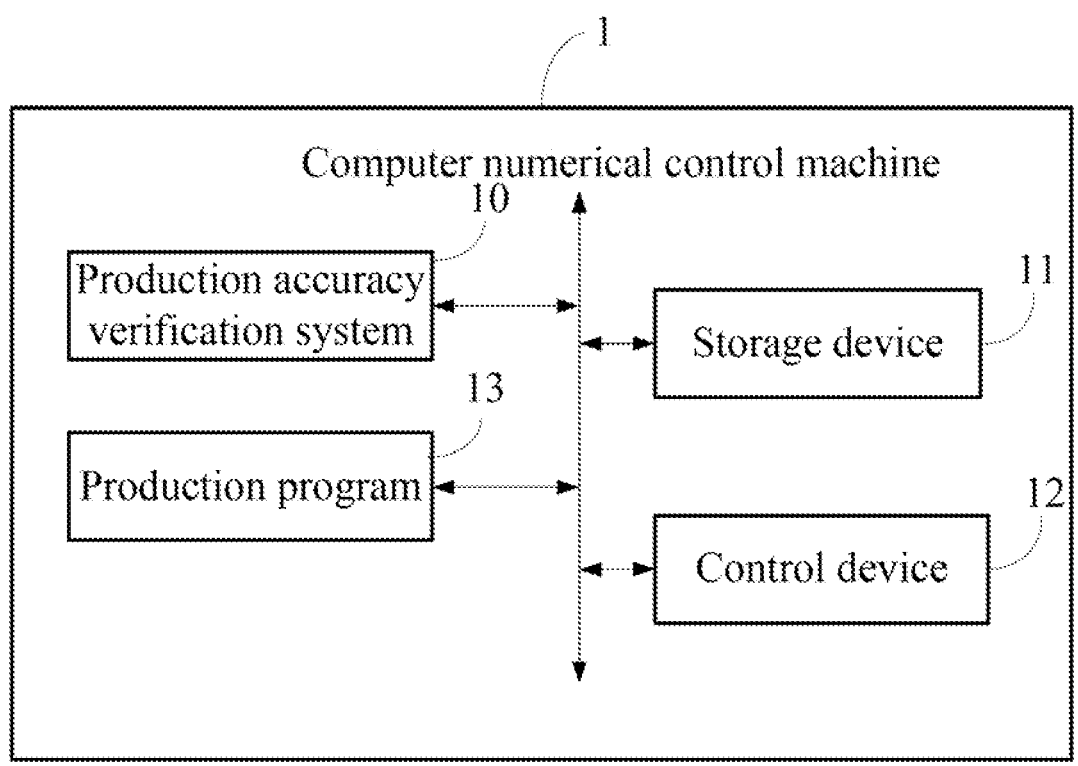
FIG. 1 illustrates a block diagram of an example embodiment of a CNC machine that includes a production accuracy verification system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

2

Several definitions that apply throughout this disclosure will now be presented.

The word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable storage medium or other computer storage device. The term "comprising," when utilized, means "including, but not necessarily limited to"; it specifically indicates open-ended inclusion or membership in the so-described combination, group, series and the like.

FIG. 1 illustrates a block diagram of an example embodiment of a computer numerical control (CNC) machine 1 that includes a production accuracy verification system 10. In the embodiment, the CNC machine 1 includes, but is not limited to, the production accuracy verification system 10, at least one storage device 11, at least one control device 12, and a production program 13. It may be understood that, FIG. 1 illustrates only one example of the CNC machine 1, and other examples can include more or fewer components than those shown in the embodiment, or have a different configuration of the various components.

Figure 2:
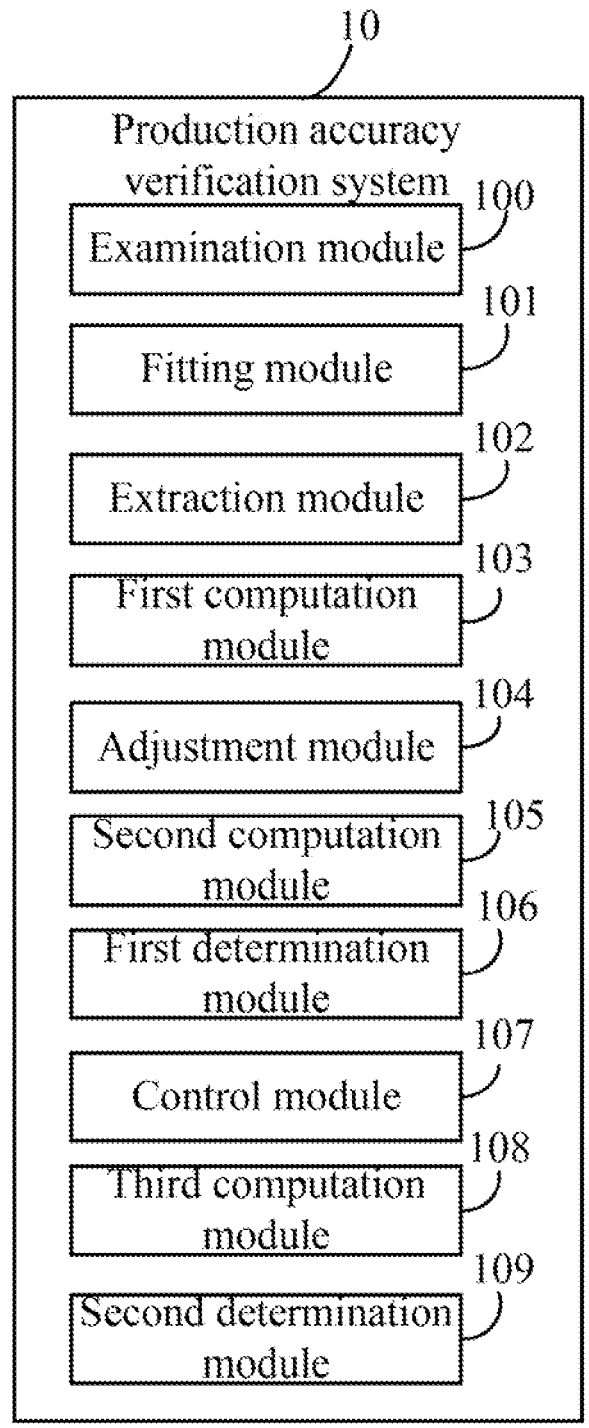
FIG. 2 illustrates a block diagram of an example embodiment of function modules of the production accuracy verification system in FIG. 1.

The production accuracy verification system 10 includes various function modules (see FIG. 2 depicted below) including computerized instructions in the form of one or more computer-readable programs that can be stored in the at least one storage device 11, and can be implemented by the at least one control device 12 of the CNC machine 1.

In one embodiment, the at least one storage device 11 can include an internal storage system, such as a flash memory, a random access memory (RAM) for temporary storage of information, and/or a read-only memory (ROM) for permanent storage of information. The storage device 11 can also include an external storage system, such as an external hard disk, a storage card, or a data storage medium.

The at least one control device 12 can include a central processing unit (CPU), a microprocessor, or other data processing chip that can perform various functions of the CNC machine 1.

The production program 13 includes programmed commands encoded on a storage medium, such as the storage device 11, when executed by a processor, such as the control device 12, to control the CNC machine 1 to process production materials to produce a product.

FIG. 2 illustrates a block diagram of an example embodiment of the function modules of the production accuracy verification system 10. The function modules can include a examination module 100, a fitting module 101, an extraction module 102, a first computation module 103, an adjustment module 104, a second computation module 105, a first determination module 106, a control module 107, a third computation module 108, and a second determination module 109.

When the production program 13 is running, the examination module 100 can examine the production program 13 to determine whether the production program 13 is correct. In one embodiment, when the examiner module 100 determines that each row of program codes of the production program 13 includes at least one coordinate, such as an example illustrated in FIG. 4, the production program 13 is determined to be correct. The coordinate can represent a point on an ideal processing path for processing the production materials to produce a product by the CNC machine 1.

The fitting module 101 can obtain the coordinates of the points on the ideal processing path of the production program 13, and fit a first curve according to the obtained coordinates. The fitting module 101 can use a least square method to fit the first curve.

The extraction module 102 can obtain a CAD model of the product, and extract outlines of the product in the CAD model. The extraction module 102 can obtain the CAD module from the storage device 11.

Figure 5A:
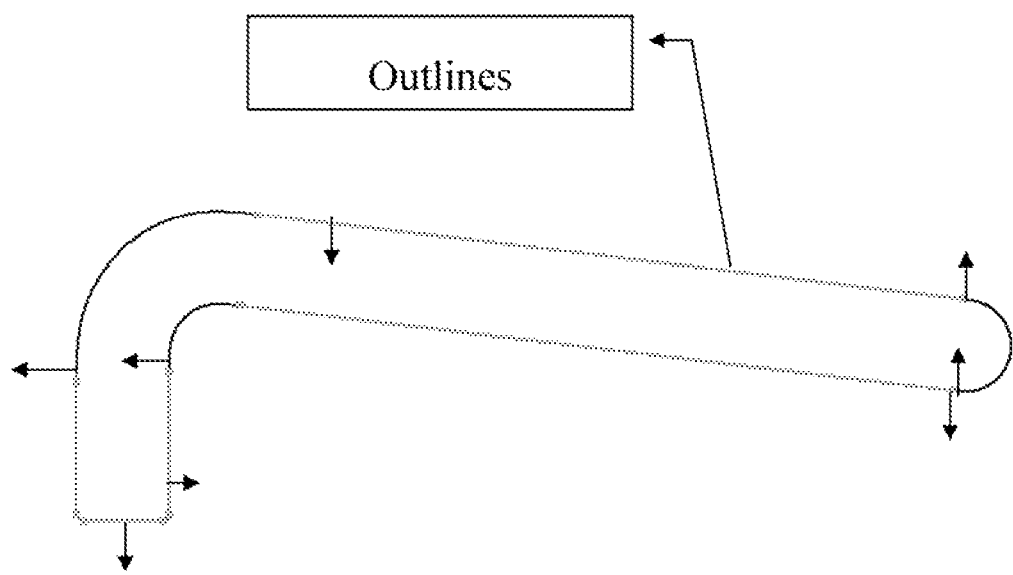
FIG. 5a and FIG. 5b illustrate examples of directions adjustment of normal vectors.

The first computation module 103 can compute a normal vector of each of the outlines. Examples of the normal vectors are illustrated in FIG. 5a. In one embodiment, the first computation module 103 computes a normal vector of an outline using the following method: selecting the first point and the second point on the outline, generating a first vector by connecting the first point and the second point, constructing a plane using the first point and the second point and obtaining a second vector which is vertical to the constructed plane, and getting the normal vector of the outline by cross-multiplying the first vector and the second vector.

Figure 5B:
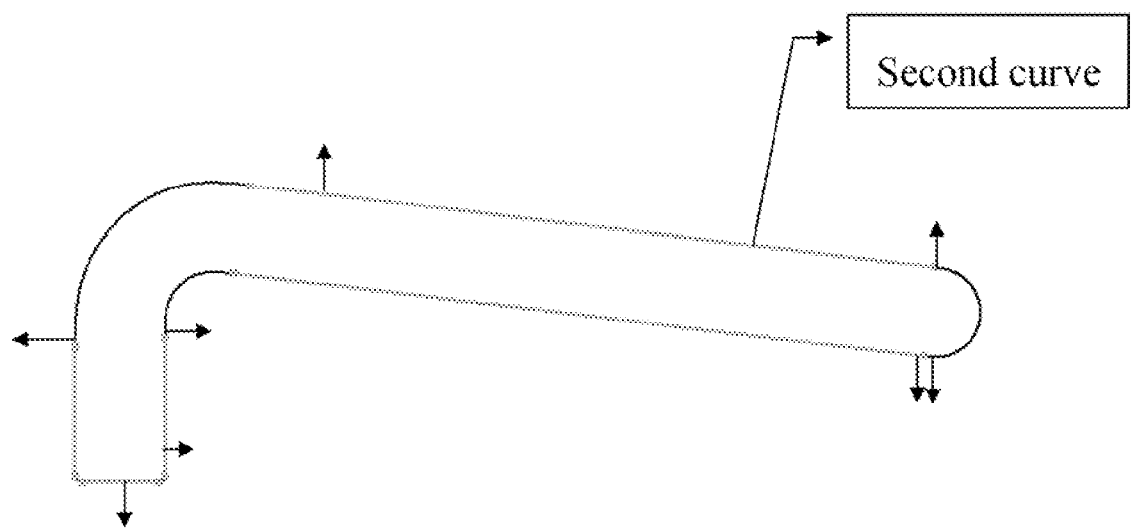

The adjustment module 104 can adjust directions of the normal vectors of the outlines, enable the normal vectors of the outline to point to a same direction, and generate a second curve. It may be understood that, the direction can point to the exterior of the outlines or point to the interior of the outlines. Referring to FIG. 5b, it illustrates that the directions of the normal vectors of the outlines are pointing to the exterior of the outlines. In one embodiment, an angle between normal vectors of two adjacent outlines is less than a predetermined angle, such as 80 degrees, it is determined that the two normal vectors are pointing to the same direction.

The second computation module 105 can compute first distances between points in the first curve and corresponding points in the second curve. In one embodiment, before computing the first distance, the second computation module 105 aligns the first curve and the second curve.

The first determination module 106 can determine whether the production program 13 is accurate by determining whether each of the first distances is within a first predetermined tolerance. In one embodiment, the production program 13 is determined to be accurate when each of the first distances is within the first predetermined tolerance, and the production program 13 is determined to be inaccurate when any first distance is beyond the first predetermined tolerance. A determination result can be output to an electronic device that connected to the CNC machine 1.

The control module 107 can control the CNC machine 1 to produce a product using the production program 13, and obtain a point cloud of the product by controlling the CNC machine to scan an actual processing path of the product to, and the fitting module 101 can fit a third curve using the point cloud. The fitting module 101 can use a least square method to fit the third curve.

The third computation module 108 can compute second distances between points in the third curve and corresponding points in the second curve. In one embodiment, before computing the first distance, the third computation module 105 aligns the third curve and the second curve.

The second determination module 109 can determine whether the product is accurate by determining whether each of the second distances is within a second predetermined tolerance. In one embodiment, the product is determined to be accurate when each of the second distances is within the second predetermined tolerance, and the product is determined to be inaccurate when any second distance is beyond the second predetermined tolerance. A determination result can be output to the electronic device.

Figure 3:
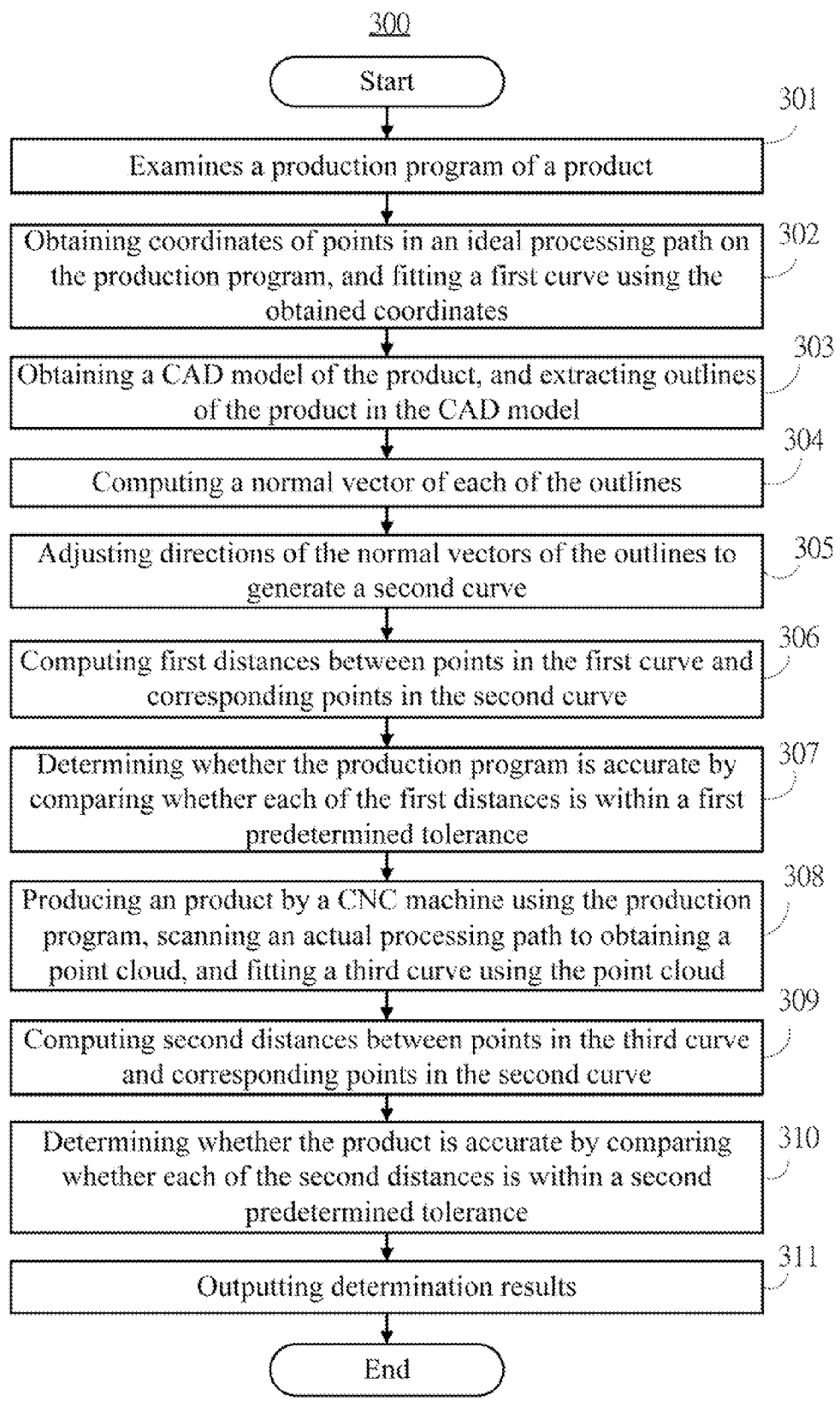
FIG. 3 is a flowchart of an example embodiment of a production accuracy verification method.

FIG. 3 is a flowchart of an example embodiment of a production accuracy verification method. Referring to FIG. 3, a flowchart is presented in accordance with an example embodiment illustrated. The example method 300 is provided by way of example, as there are a variety of ways to carry out the method. The method 300 described below can be carried out using the configurations illustrated in FIGS. 1 and 2, for example, and various elements of these figures are referenced in explaining example method 300. Each block shown in FIG. 3 represents one or more processes, methods or subroutines, carried out in the exemplary method 300. Furthermore, the illustrated order of blocks is by example only and the order of the blocks can change according to the present disclosure. Additional blocks may be added or fewer blocks may be utilized, without departing from this disclosure. The exemplary method 300 can begin at block 301.

At block 301, an examination module examines a production program installed in a CNC machine that is for processing production materials to produce a product, to determine whether the production program is correct. In one embodiment, when each row of program codes of the production program includes at least one coordinate, such as an example illustrated in FIG. 4, the production program is determined to be correct. The coordinate can represent a point on an ideal processing path that is for processing the production materials to produce a product.

At block 302, a fitting module obtains the coordinates of the points on the ideal processing path of the production program, and fits a first curve according to the obtained coordinates. The fitting module can use a least square method to fit the first curve.

At block 303, an extraction module obtains a CAD model of the product, and extracts outlines of the product in the CAD model. The extraction module can obtain the CAD module from a storage device local to the CNC machine or remote to the CNC machine.

At block 304, a first computation module computes a normal vector of each of the outlines. Examples of the normal vectors are illustrated in FIG. 5a. In one embodiment, the first computation module computes a normal vector of an outline using the following method: selecting the first point and the second point on the outline, generating a first vector by connecting the first point and the second point, constructing a plane using the first point and the second point and obtaining a second vector which is vertical to the constructed plane, and getting the normal vector of the outline by cross-multiplying the first vector and the second vector.

At block 305, an adjustment module adjusts directions of the normal vectors of the outlines, enables the normal vectors of the outline to point to a same direction, and generates a second curve. It may be understood that, the direction can point to the exterior of the outlines or point to the interior of the outlines. Referring to FIG. 5b, it illustrates that the directions of the normal vectors of the outlines point to the exterior of the outlines. In one embodiment, an angle between normal vectors of two adjacent outlines is less than a predetermined angle, such as 80 degrees, it is determined that the two normal vectors are pointing to the same direction.

At block 306, a second computation module computes first distances between the points in the first curve and corresponding points in the second curve. In one embodiment, before computing the first distance, the first curve and the second curve are aligned.

At block 307, a first determination module determines whether the production program is accurate by determining whether each of the first distances is within a first predetermined tolerance. In one embodiment, the production program is determined to be accurate when each of the first distances is within the first predetermined tolerance, and the production program is determined to be inaccurate when any of the first distances is beyond the first predetermined tolerance.

At block 308, a control module controls the CNC machine to produce an product using the production program, and obtains a point cloud of the product by controlling the CNC machine to scan an actual processing path of the product, and a fitting module fits a third curve using the point cloud. The fitting module can use a least square method to fit the third curve.

At block 309, a third computation module computes second distances between points in the third curve and corresponding points in the second curve. In one embodiment, before computing the second distance, the third curve and the second curve are aligned.

At block 310, a second determination module determines whether the product is accurate by determining whether each of the second distances is within a second predetermined tolerance. In one embodiment, the product is determined to be accurate when each of the second distances is within the second predetermined tolerance, and the product is determined to be inaccurate when any second distance is beyond the second predetermined tolerance.

At block 311, determination results of whether the production program is accurate and whether the product is accurate can be output to an electronic device which connects to the CNC machine 1.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method of verifying production accuracy, the method comprising:
   obtaining coordinates of points on an ideal processing path of a production program in a computer numerical control (CNC) machine, and fitting a first curve according to the obtained coordinates;
   obtaining a computer-aided design (CAD) model of a product, and extracting outlines of the product in the CAD model;
   computing a normal vector of each of the outlines, and generating a second curve by adjusting directions of the normal vector of each of the outlines;
   computing first distances between points in the first curve and corresponding points in the second curve;
   determining whether the production program is accurate by determining whether each of the first distances is within a first predetermined tolerance;
   outputting a determination result of the production program to an electronic device that connected to the CNC machine;
   controlling the CNC machine to produce the product using the production program, obtaining a point cloud of the product by controlling the CNC machine to scan an actual processing path of the product, and fitting a third curve using the point cloud;
   computing second distances between points in the third curve and corresponding points in the second curve;
   determining whether the product is accurate by comparing whether each of the second distances is within a second predetermined tolerance; and
   outputting a determination result of the product to the electronic device,
   wherein the product is determined to be accurate when each of the second distances is within the second predetermined tolerance, and the product is determined to be inaccurate when any of the second distances is beyond the second predetermined tolerance.

2. The method according to claim 1, wherein the directions of the normal vectors are adjusted to point to a same direction.

3. The method according to claim 2, wherein the directions of the normal vectors are adjusted to point to exterior of the outlines or point to interior of the outlines.

4. The method according to claim 1, wherein the production program is determined to be accurate when each of the first distances is within the first predetermined tolerance, and the production program is determined to be inaccurate when any of the first distances is beyond the first predetermined tolerance.

5. The method according to claim 1, further comprising:
   aligning the first curve and the second curve before computing the first distance.

6. A computer numerical control (CNC) machine, wherein the CNC machine comprises:
   a control device; and
   a storage device storing one or more programs which, when executed by the control device, causes the control device to:
   obtain coordinates of points on an ideal processing path of a production program in the CNC machine, and fit a first curve according to the obtained coordinates;
   obtain a computer-aided design (CAD) model of the product, and extract outlines of the product in the CAD model;
   compute a normal vector of each of the outlines, and generate a second curve by adjusting directions of the normal vector of each of the outlines;
   compute first distances between points in the first curve and corresponding points in the second curve;
   determine whether the production program is accurate by determining whether each of the first distances is within a first predetermined tolerance;
   output a determination result of the production program to an electronic device that connected to the CNC machine;
   control the CNC machine to produce the product using the production program, obtain a point cloud of the product by controlling the CNC machine to scan an actual processing path of the product, and fit a third curve using the point cloud;

compute second distances between points in the third curve and corresponding points in the second curve;

determine whether the product is accurate by comparing whether each of the second distances is within a second predetermined tolerance; and output a determination result of the product to the electronic device, wherein the product is determined to be accurate when each of the second distances is within the second predetermined tolerance, and the product is determined to be inaccurate when any of the second distances is beyond the second predetermined tolerance.

7. The CNC machine according to claim 6, wherein the directions of the normal vectors are adjusted to point to a same direction.

8. The CNC machine according to claim 7, wherein the directions of the normal vectors are adjusted to point to exterior of the outlines or point to interior of the outlines.

9. The CNC machine according to claim 6, wherein the production program is determined to be accurate when each of the first distances is within the first predetermined tolerance, and the production program is determined to be inaccurate when any of the first distances is beyond the first predetermined tolerance.

10. The CNC machine according to claim 6, the one or more programs when executed by the control device, further causes the control device to:

aligning the first curve and the second curve before computing the first distance.

11. A non-transitory storage medium having stored thereon instructions that, when executed by a processor, causes the processor to perform a production accuracy verification method, wherein the method comprises:

obtaining coordinates of points on an ideal processing path of a production program in a computer numerical control (CNC) machine, and fitting a first curve according to the obtained coordinates;

obtaining a computer-aided design (CAD) model of the product, and extracting outlines of the product in the CAD model;

computing a normal vector of each of the outlines, and generating a second curve by adjusting directions of the normal vector of each of the outlines;

computing first distances between points in the first curve and corresponding points in the second curve;

determining whether the production program is accurate by determining whether each of the first distances is within a first predetermined tolerance;

outputting a determination result of the production program to an electronic device that connected to the CNC machine;

controlling the CNC machine to produce the product using the production program, obtaining a point cloud of the product by controlling the CNC machine to scan an actual processing path of the product, and fitting a third curve using the point cloud;

computing second distances between points in the third curve and corresponding points in the second curve;

determining whether the product is accurate by comparing whether each of the second distances is within a second predetermined tolerance; and outputting a determination result of the product to the electronic device, wherein the product is determined to be accurate when each of the second distances is within the second predetermined tolerance, and the product is determined to be inaccurate when any of the second distances is beyond the second predetermined tolerance.

12. The non-transitory storage medium according to claim 11, wherein the directions of the normal vectors are adjusted to point to a same direction.

13. The non-transitory storage medium according to claim 12, wherein the directions of the normal vectors are adjusted to point to exterior of the outlines or point to interior of the outlines.

14. The non-transitory storage medium according to claim 11, wherein the production program is determined to be accurate when each of the first distances is within the first predetermined tolerance, and the production program is determined to be inaccurate when any of the first distances is beyond the first predetermined tolerance.

* * * * *